United States Patent
Couture

(10) Patent No.: US 9,912,156 B2
(45) Date of Patent: Mar. 6, 2018

(54) SWITCHING APPARATUS AND METHOD FOR VARYING AN IMPEDANCE OF A PHASE LINE OF A SEGMENT OF AN ELECTRICAL POWER LINE

(71) Applicant: HYDRO-QUÉBEC, Montreal (CA)

(72) Inventor: Pierre Couture, Boucherville (CA)

(73) Assignee: HYDRO-QUÉBEC, Montreal, QC (CA)

( * ) Notice: Subject to any disclaimer, the term of this patent is extended or adjusted under 35 U.S.C. 154(b) by 157 days.

(21) Appl. No.: 14/905,184

(22) PCT Filed: Oct. 4, 2013

(86) PCT No.: PCT/CA2013/050748
§ 371 (c)(1),
(2) Date: Jan. 14, 2016

(87) PCT Pub. No.: WO2015/048875
PCT Pub. Date: Apr. 9, 2015

(65) Prior Publication Data
US 2016/0211666 A1    Jul. 21, 2016

(51) Int. Cl.
*H01H 33/28* (2006.01)
*H01H 33/59* (2006.01)
(Continued)

(52) U.S. Cl.
CPC .............. *H02J 3/18* (2013.01); *H01H 31/34* (2013.01); *H01H 33/027* (2013.01);
(Continued)

(58) Field of Classification Search
CPC combination set(s) only.
See application file for complete search history.

(56) References Cited

U.S. PATENT DOCUMENTS 2,797,344 A    6/1957  Peirce
2,917,703 A    12/1959 Minder
(Continued)

FOREIGN PATENT DOCUMENTS

WO          02/41459        5/2002

OTHER PUBLICATIONS

International Search Report (ISR) (PCT Form PCT/ISA/210) in international Patent Application No. PCT/CA2013/050748 dated Oct. 30, 2013.

(Continued)

*Primary Examiner* — An Luu
(74) *Attorney, Agent, or Firm* — Baker & Hostetler LLP

(57) ABSTRACT

The switching apparatus and the method are for varying the impedance of a phase line of a segment of an electrical power line. The phase line includes n conductors electrically insulated from each other and short-circuited together at two ends of the segment. The apparatus comprises a controllable interrupter connected in series for each conductor; a parameter detector; a first controller for controlling the interrupters; and a disabling unit for disabling the interrupters. The disabling unit comprises n controllable switches associated with the interrupters, position detectors for detecting which of the interrupters is closed, and a second controller having a command output to command the controllable switches and ensure that, at all operating times, at least one of the interrupters is closed and disabled.

15 Claims, 15 Drawing Sheets

(51) Int. Cl.
*H02J 3/18* (2006.01)
*H01H 31/34* (2006.01)
*H01H 33/02* (2006.01)
*H01H 33/52* (2006.01)
*H01H 33/66* (2006.01)
*H01H 33/36* (2006.01)

(52) U.S. Cl.
CPC ............ *H01H 33/28* (2013.01); *H01H 33/52* (2013.01); *H01H 33/59* (2013.01); *H01H 33/66* (2013.01); *H01H 33/36* (2013.01); *Y02E 40/30* (2013.01)

(56) References Cited

U.S. PATENT DOCUMENTS

| | | | |
|---|---|---|---|
| 4,082,962 A | 4/1978 | Burgsdorf et al. | |
| 4,126,792 A | 11/1978 | Genrikh et al. | |
| 4,317,076 A | 2/1982 | Price | |
| 6,127,637 A * | 10/2000 | Estey | H01H 33/128 200/48 P |
| 6,396,172 B1 | 5/2002 | Couture | |
| 7,157,812 B2 * | 1/2007 | Couture | H02J 3/06 307/112 |
| 7,235,900 B1 | 6/2007 | Couture | |
| 7,639,460 B2 | 12/2009 | Couture et al. | |
| 8,502,542 B2 * | 8/2013 | Couture | G01R 31/085 324/500 |

OTHER PUBLICATIONS

Couture, "Smart Power Line and photonic de-icer concepts for transmission-line capacity and reliability improvement", Cold Regions Science and Technology, vol. 65, No. 1, Jan. (2011).

* cited by examiner

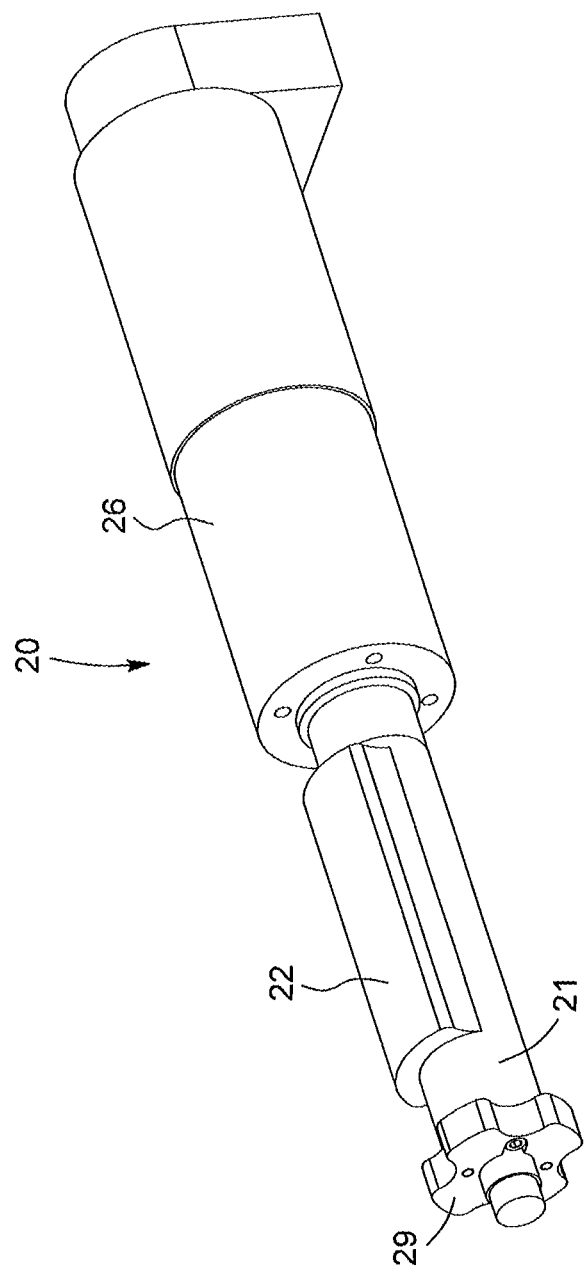

SWITCHING APPARATUS AND METHOD FOR VARYING AN IMPEDANCE OF A PHASE LINE OF A SEGMENT OF AN ELECTRICAL POWER LINE

FIELD OF THE INVENTION

The present invention relates to a switching apparatus and a method for varying an impedance of a phase line of a segment of an electrical power line.

BACKGROUND OF THE INVENTION

Known in the art is U.S. Pat. No. 7,639,460 B2. This document describes a switching apparatus and a method for varying the impedance of a phase line of a segment of an electrical power line. The phase line includes n conductors electrically insulated from each other and short-circuited together at two ends of the segment. More particularly, the apparatus includes at least one first vacuum interrupter connected in series with at least one of the conductors, at least one first controllable motor for selectively opening and closing the at least one first vacuum interrupter, and a controller for controlling the at least one first controllable motor according to a parameter representative of the current operating conditions of the phase line. U.S. Pat. No. 7,639,460 B2 is herein incorporated by reference.

Also known is a paper by the inventor published in the January 2011 edition of the journal "Cold Regions Science and Technology" (volume 65, issue 1) entitled "Smart Power Line and photonic de-icer concepts for transmission-line capacity and reliability improvement". The paper relates to a Smart Power Line concept, and its implementation on new or existing transmission lines. The Smart Power Line addresses three needs: line de-icing, line impedance modulation, and line monitoring.

Also known in the art is the U.S. Pat. No. 6,396,172 and the PCT application published under the international publication no. WO 02/41459. In these documents, there is described a switching apparatus also intended to be used with a segment of an electrical power line having several phase lines.

Also known in the art is U.S. Pat. No. 2,797,344. This patent describes an apparatus for deicing electric cables. This patent proposes that, in a power transmission line, a cable having a pair of conductors insulated from each other is provided. An electrical bridge is connected in series with one of the conductors. A means is provided for opening the electrical bridge, and another means is provided for operating the electrical bridge in response to ice accumulation on the cable. The electric bridge comprises a normally closed switch which is open by the means that responds to an ice accumulation on the cable.

Also known in the art is U.S. Pat. No. 4,082,962. This patent describes a device for melting the ice by direct current through conductors of an overhead power transmission line. This patent proposes the use of a rectifier that is temporarily connected to the end of one of the conductors of the line. The apparatus also comprises a grounding circuit as well as a circuit filter connected parallel to the rectifier. The circuit proposed in this patent uses a rectified current for deicing the line. For each section of the line, a rectifier, a grounding circuit and a circuit filter are used.

Also known in the art is U.S. Pat. No. 4,126,792. This patent proposes a high-voltage network for areas of increased intensity of icing. This patent proposes the use of a rectifier and a switching circuit for connecting at least one conductor of the line to the rectifier so as to melt the ice by a rectified current.

One of the drawbacks which can be found in at least some of the above-mentioned switching apparatuses and methods is that some of these apparatuses and methods may not allow for an efficient and safe switching of the conductors of a segment of an electric power line.

One of the objects of the present invention is to propose a switching apparatus and method for a segment of an electric power line which enables the interrupters of the conductors of a segment of the line to be switched between a closed and an open position, in an efficient, safe, and economical manner.

The objects, advantages and other features of the present invention will be more apparent upon the reading of the following non restrictive description of different optional embodiments given as examples only in reference with the attached drawings.

SUMMARY OF THE INVENTION

According to the present invention, there is provided a switching apparatus for varying an impedance of a phase line of a segment of an electrical power line, the phase line including n conductors electrically insulated from each other, n being equal to or greater than 2, the n conductors being short-circuited together at two ends of the segment; the apparatus comprising:
  for each conductor, a controllable interrupter connected in series, said interrupter having command terminals for receiving first command signals for selectively switching said interrupter into a closed or an opened position;
  a parameter detector for detecting a parameter representative of an actual operating condition of the phase line;
  a first controller for controlling the interrupters via their command terminals, according to the parameter detected by the detector; and
  a disabling unit for disabling the interrupters, said disabling unit comprising:
    n controllable switches associated respectively to the n controllable interrupters for respectively disabling the n controllable interrupters;
    position detectors for detecting which of the n interrupters is closed; and
    a second controller having first inputs for receiving position signals from the position detectors, a second input for receiving second command signals for commanding the disabling unit, and command outputs to command the n controllable switches in view of said second command signals and said position signals so that, at all operating times, at least one of the n interrupters is closed and disabled.

According to the present invention, there is also provided a method for varying an impedance of a phase line of a segment of an electrical power line, the phase line including n conductors electrically insulated from each other, n being equal to or greater than 2, the n conductors being short-circuited together at two ends of the segment, each conductor having a controllable interrupter being connected in series, said controllable interrupter having command terminals for receiving command signals for selectively switching said interrupter into a closed or an opened position, the method comprising steps of: detecting a parameter representative of an actual operating condition of the phase line; controlling the interrupters via their command terminals, according to the parameter detected; and disabling the interrupters by means of n controllable switches associated respectively to the n controllable interrupters. The step of disabling the interrupters comprises the steps of: detecting which of the n interrupters is closed; and commanding the n controllable switches so that, at all operating times, at least one of the n interrupters is closed and disabled.

BRIEF DESCRIPTION OF THE FIGURES

FIG. 12 is a perspective view of components of a disabling unit, according to another preferred embodiment of the present invention;

DETAILED DESCRIPTION OF EMBODIMENTS

The present invention relates to a switching apparatus and corresponding method for varying an impedance of a phase line of a segment of an electrical power line.

Some potential applications of the present invention include the following: line impedance modulator (LIM); line deicer; on-line power supply; current limiter; sub-synchronism resonance damping; inter-area oscillations damping; and breaking resistor.

Figure 1:
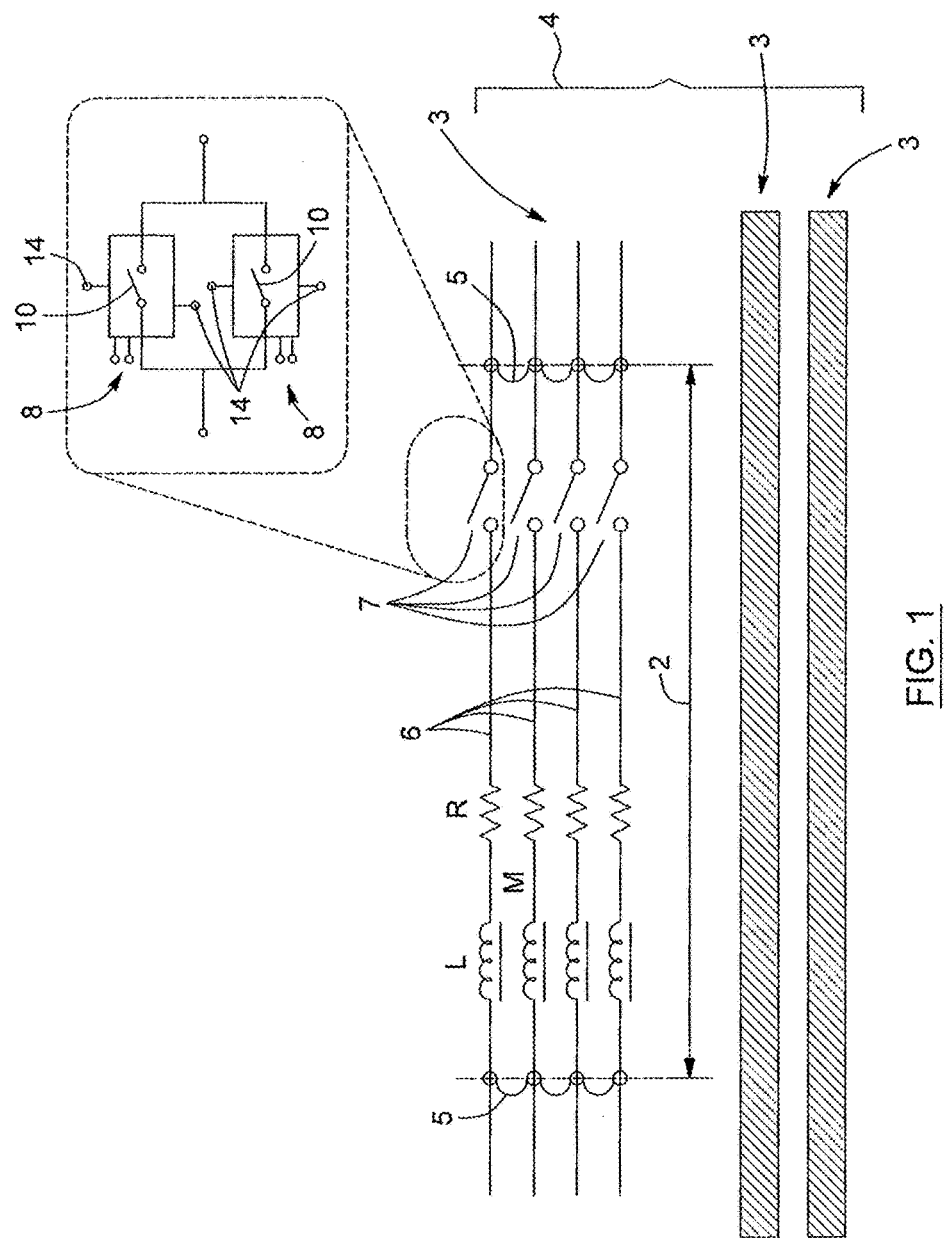
FIG. 1 is a schematic view of a segment of an electrical power line provided with interrupters.

Referring to FIGS. 1 to 11, the switching apparatus is shown acting on a phase line 3 of a segment 2 of an electrical power line 4. The phase line 3 includes "n" number of conductors 6, where n is greater than or equal to two. In the example provided in FIG. 1, the phase line 3 is shown as having four conductors 6, but the phase line 3 can also have more or fewer conductors 6 if required. Similarly, there can be more or fewer than the three phase lines 3 shown in FIG. 1. The n conductors 6 are electrically insulated from each other and short-circuited together at two ends of the segment 2 by means of short circuits 5. The letters "R", "L", and "M" shown in FIG. 1 represent the resistance, the inductance and the mutual inductance, respectively, of the segment 2 of the phase lines 3.

The apparatus has a controllable interrupter 7 for each of the conductors 6 of the phase line 3. Each interrupter 7 is connected in series with its corresponding conductor 6. Each interrupter 7 has command terminals 8 which can receive command signals. These command signals selectively operate each interrupter 7 between a closed and an open position. In the closed position, the interrupter 7 forms a galvanic link across its conductor 6, allowing the current to flow through this conductor 6. In the open position, the interrupter 7 does not form a galvanic link across its conductor 6, thus preventing current from flowing through this conductor 6. It can thus be appreciated that varying the position of each of the interrupters 7 of the phase line 3 can produce desired effects. For example, if three of the four interrupters 7 shown in FIG. 1 are in the open position, while the fourth interrupter 7 is in the closed position, current will flow through only this fourth conductor 6 of the phase line 3. This can allow for this fourth conductor 6 to generate heat through electrical resistance, and thus melt ice, for example. For safety and operational purposes, at least one of the interrupters 7 must be in the closed position at all times so that current is able to flow through the phase line 3. It can thus be appreciated how varying the position of each of the interrupters 7 can allow for current to flow through each of the conductors 6 in turn, thus allowing each of the conductors 6 to melt ice accumulating thereon, for example.

In some embodiments, each of the interrupters 7 can consist of a mechanical interrupter. In other embodiments, each of interrupters 7 can consist of at least one vacuum interrupter 10, an example of which is shown in FIGS. 2A and 2B. The expression "at least one" refers to the presence of one or more vacuum interrupters 10, such as when there is a pair of vacuum interrupters 10 connected in parallel, an example of which is shown in FIGS. 1, 2A, and 2B. Each vacuum interrupter 10 can include a motor 12 which opens or closes its corresponding vacuum interrupter 10 depending on the command signals received by the motor 12, and each motor 12 has supply terminals 14. Further optionally, one or more of the vacuum interrupters 10 can be an electrical or electronic switch.

Figure 3:
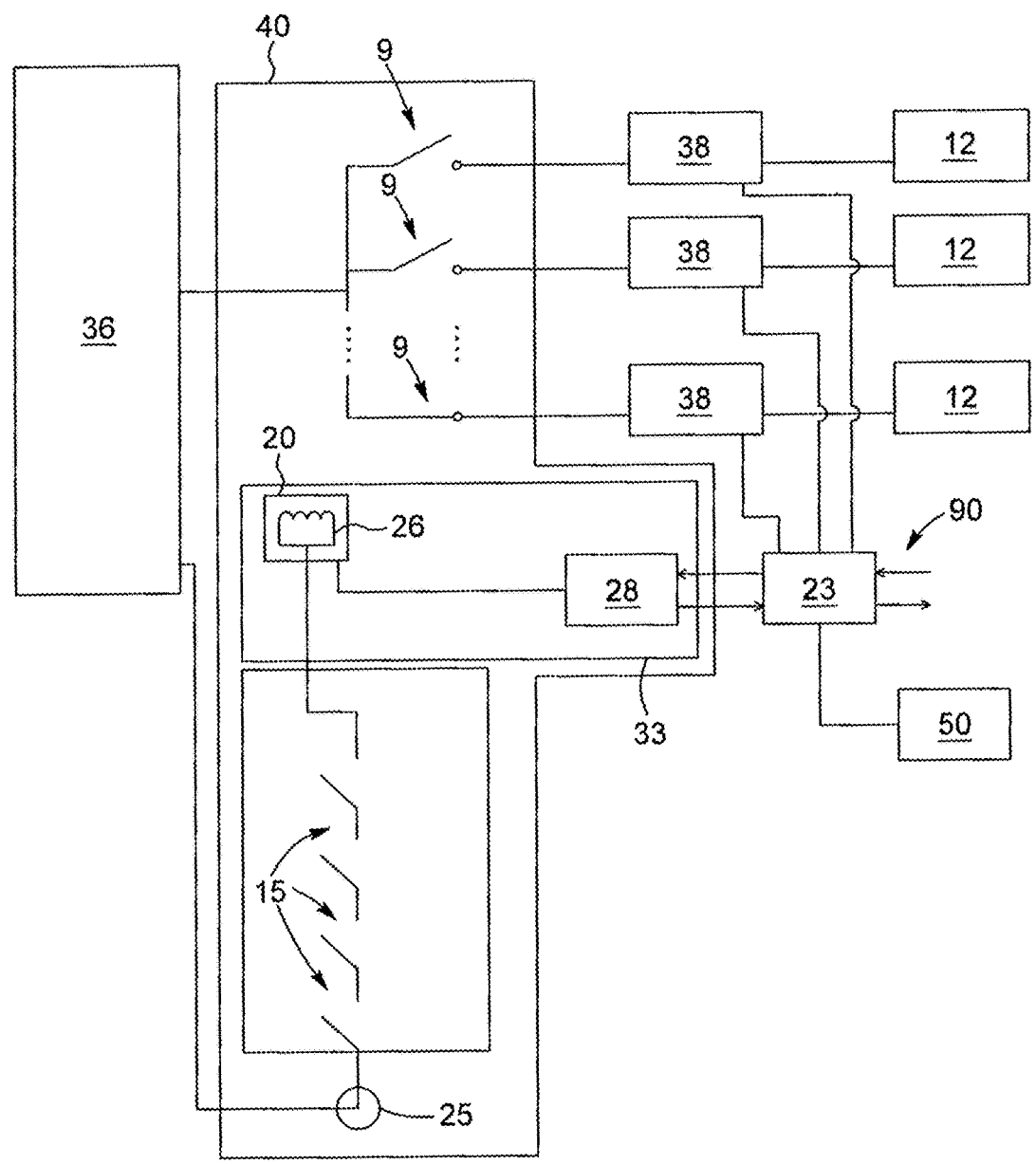
FIG. 3 is block diagram showing components of a switching apparatus, according to a preferred embodiment of the present invention.
Figure 4:
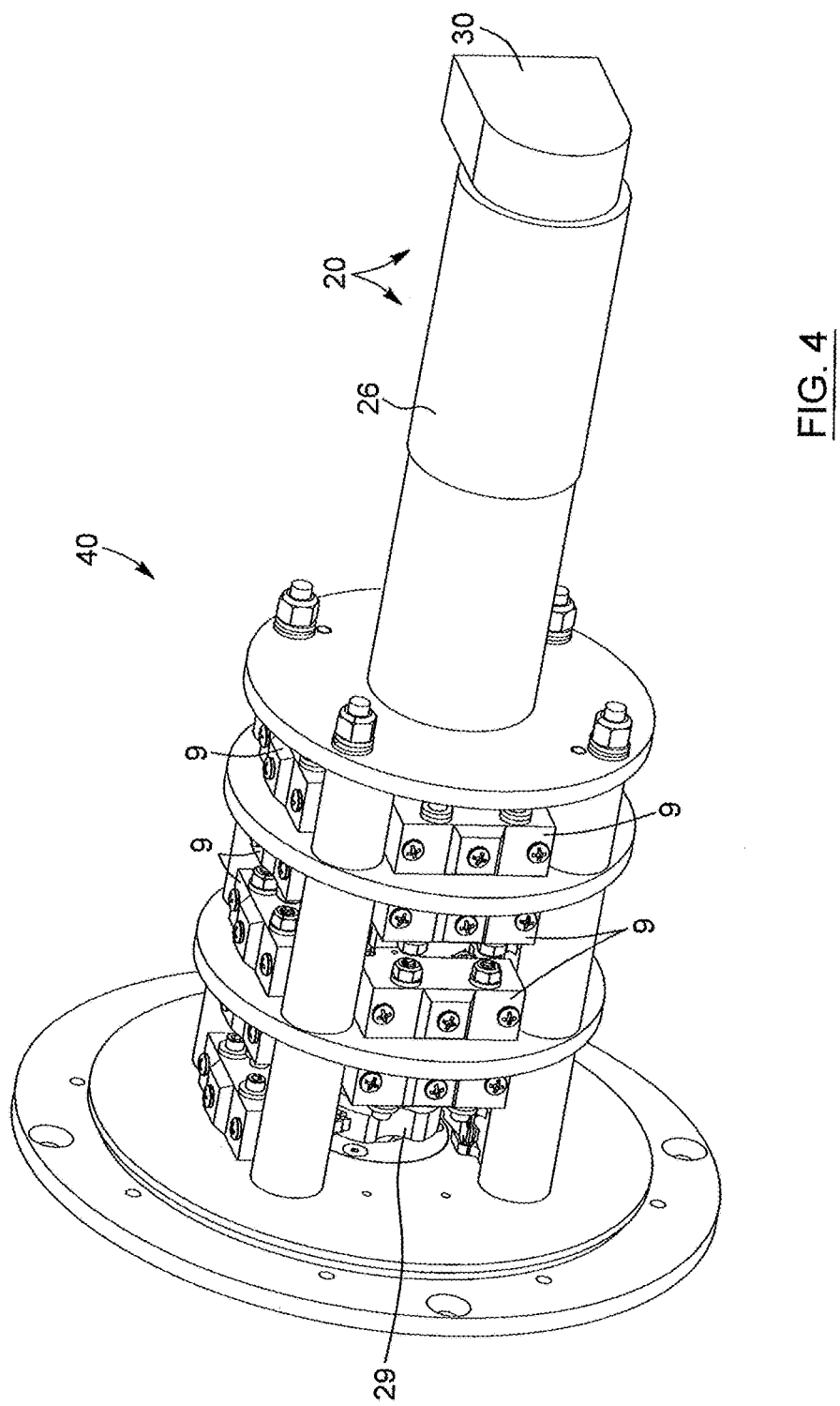
FIG. 4 is a perspective view of components of a switching apparatus, according to a preferred embodiment of the present invention.

Referring to FIG. 3, the apparatus also includes a parameter detector 50, which detects a parameter which is indicative of the current or actual operating conditions of the phase line 3. Some of these parameters can include, for example, current in the interrupters 7, mechanical tension acting on a phase line 3, and the position of the interrupter. The apparatus also comprises a first controller 23, an example of which is shown in FIG. 3. The first controller 23 controls the interrupters 7 based on the parameter detected by the parameter detector. The term "control" as used in the context of the first controller 23 refers to the ability of the first controller 23 to command the opening and closing of the interrupters 7 by generating the command signals which are received at the command terminals 8 of each interrupter 7. The first controller 23 can have multiple input and output busses 90 for communicating with other systems or sub-systems.

The apparatus also includes a disabling unit 40, examples of which are shown in FIGS. 3 to 11. The disabling unit 40 is capable of disabling the interrupters 7, such as via their respective motors 12. The term "disabling" refers to the ability of the disabling unit 40 to switch off or otherwise deactivate at least one of the interrupters 7 so that they cannot be commanded between a closed position to an open position, and vice versa.

Figure 5:
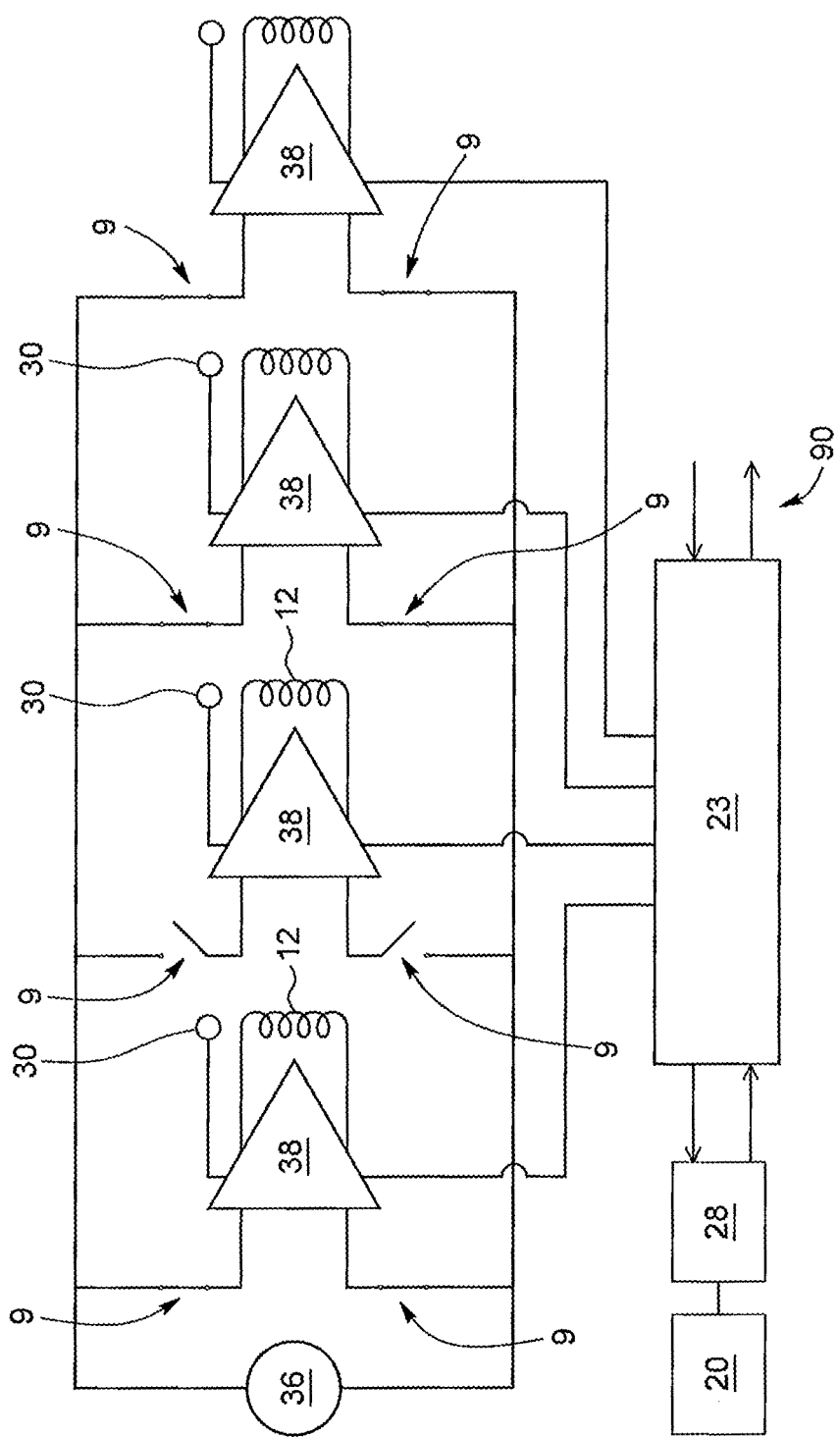
FIG. 5 is a circuit diagram showing controllable switches associated with motors of corresponding interrupters of a segment of an electrical power line, according to another preferred embodiment of the present invention.
Figure 6:
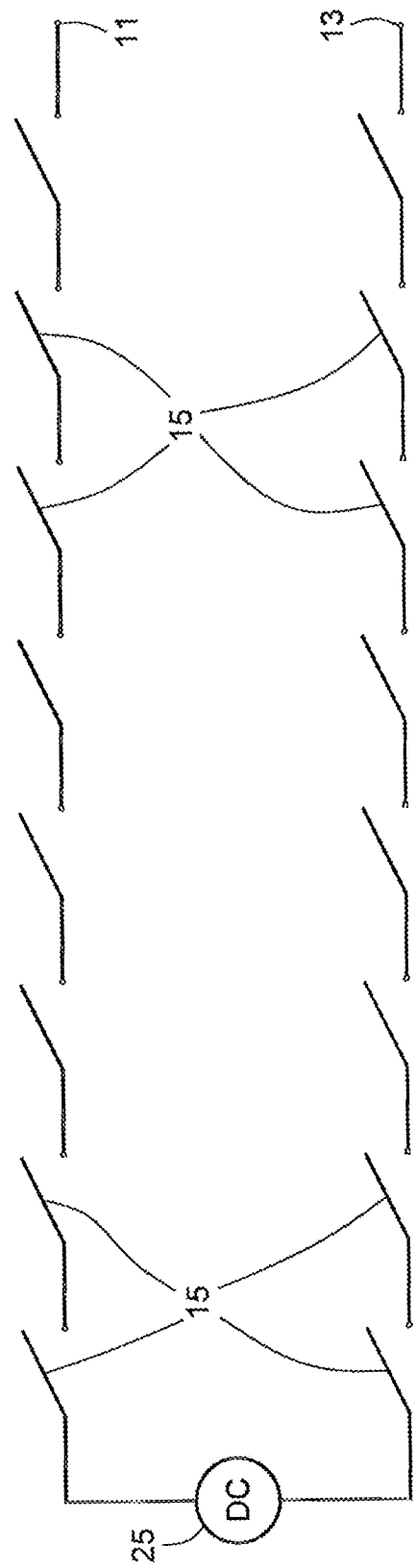
FIG. 6 is a schematic view showing a power source for a cam motor, with position switches, according to another preferred embodiment of the present invention.

Referring to FIGS. 3 to 11, the disabling unit 40 has a number "n" of controllable switches 9 which are each associated with the interrupters 7 so as to disable them. The movement of the controllable switches 9 can disable and enable the corresponding motor 12 which controls the movement of the interrupters 7 between the open and closed positions. In some embodiments, and as shown in FIG. 3, the controllable switches 9 are connected to motor controllers 38, which control the operation of the corresponding motors 12. Referring now to FIGS. 3 and 6, the disabling unit 40 also includes multiple position detectors 15, which detect which of the interrupters 7 are in a closed position.

Figure 7:
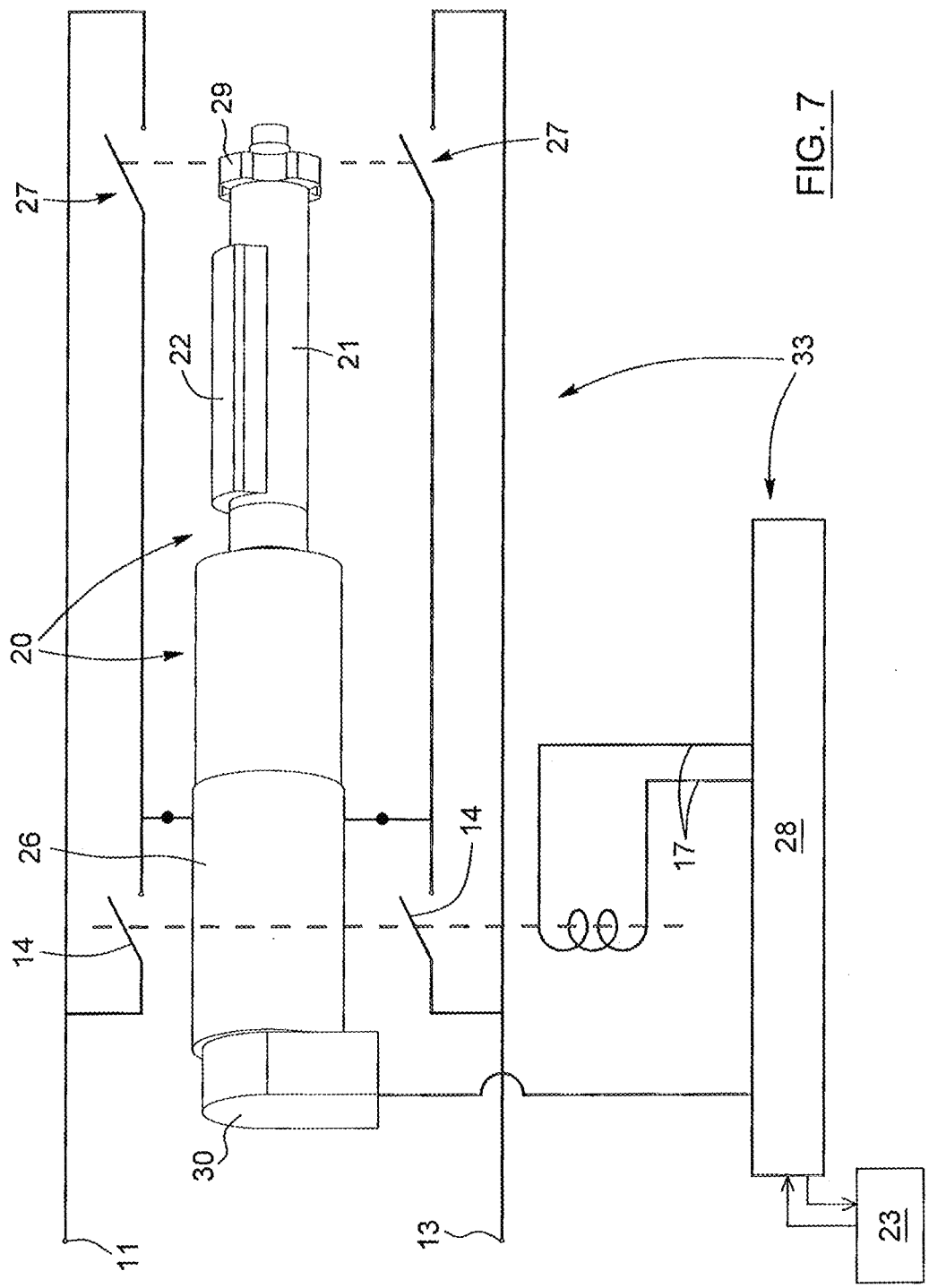
FIG. 7 is a schematic showing a rotatable cam unit cooperating with a position encoder and a cam controller, according to another preferred embodiment of the present invention.
Figure 8:
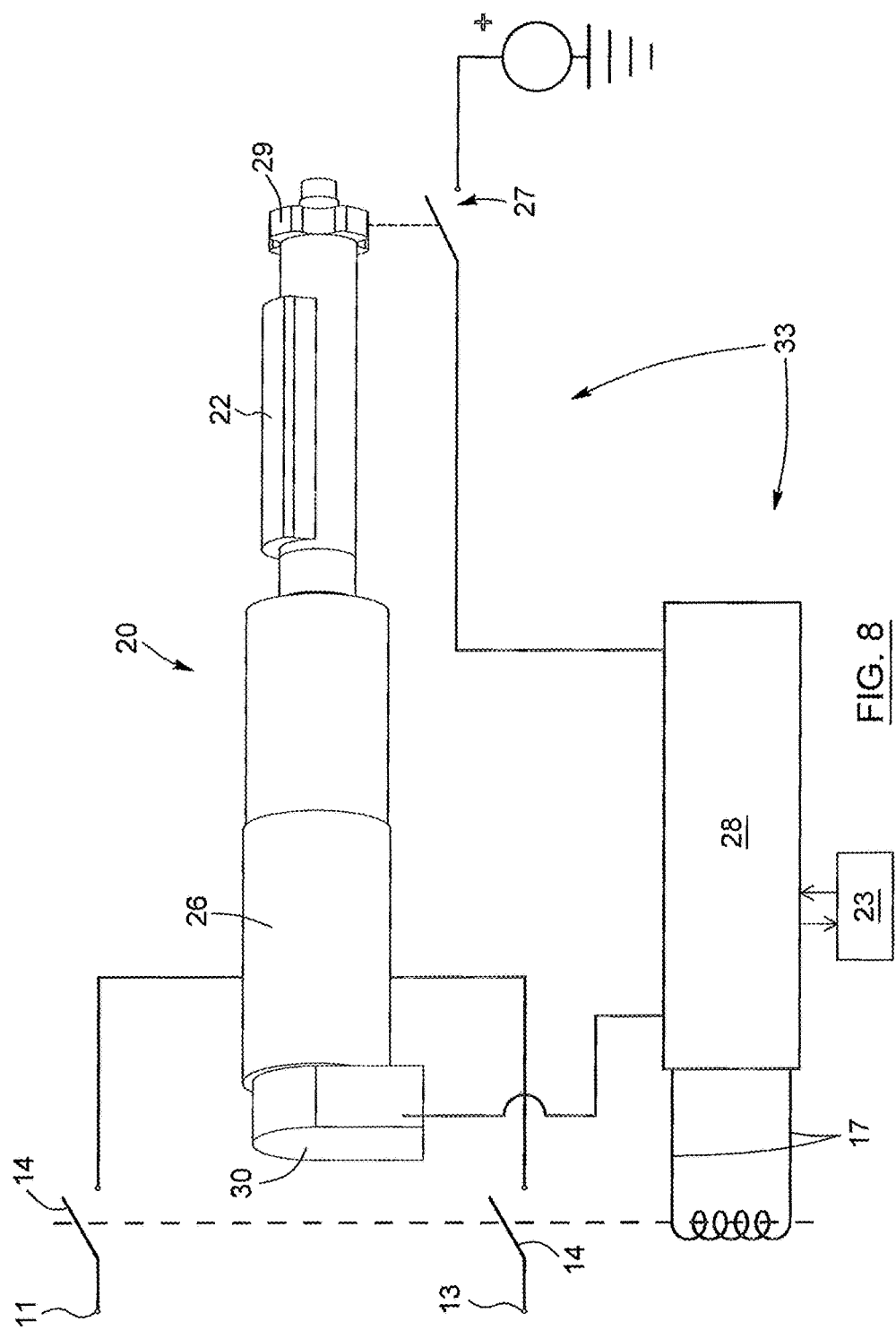
FIG. 8 is a schematic view showing a rotatable cam unit cooperating with another position encoder and another cam controller, according to another preferred embodiment of the present invention.

Referring to FIGS. 3, 7 and 8, the disabling unit 40 also has a second controller 33. The second controller 33 has a power supply input 11,13 which receives a supply signal responsive to the positions of the position detectors 15. This signal is indicative of whether the interrupters 7 are in a closed position. Based on this signal from the position detectors 15, the second controller 33 commands the controllable switches 9 via a command output 17 so that at least one interrupter 7 is closed and disabled at all times of operation. In the present embodiment, the command output 17 will only command the controllable switches 9 when the input 11,13 indicates that all the interrupters 7 are in the closed position. The second controller 33 also has a second input for receiving signals. In some embodiments, the second input is used to receive signals from the first controller 23. It can thus be appreciated that the disabling unit 40 makes sure that current flows through the phase line 3 at all times, and also makes sure that all of the interrupters 7 of a given phase line 3 are prevented from being opened accidentally at the same time.

Having described the switching apparatus in some detail, additional optional components and features of the apparatus will now be described in reference to the figures.

Figure 2:
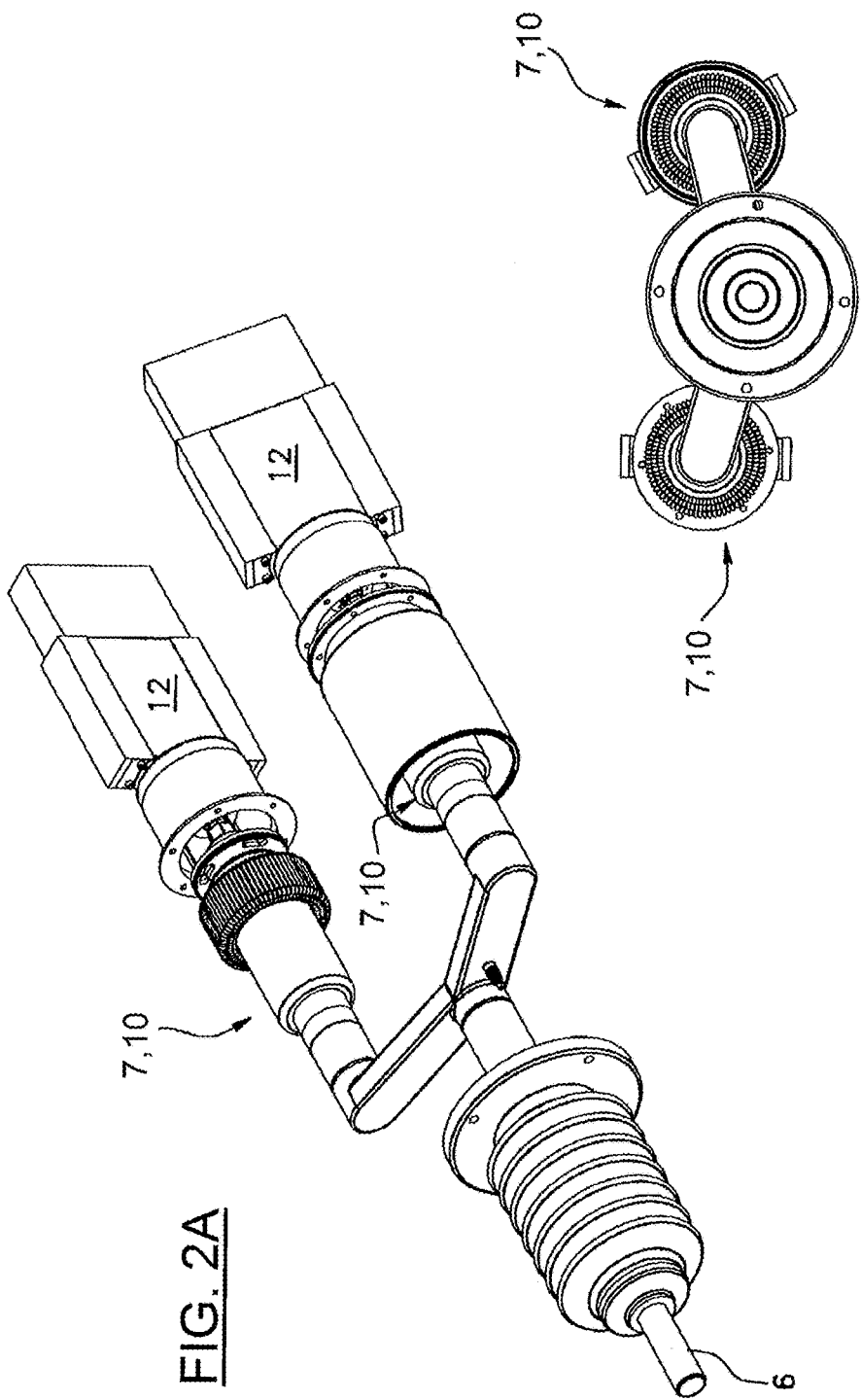
FIG. 2A is a perspective view of a conductor of a phase line of an electrical power line provided with a pair of vacuum interrupters connected in parallel.
FIG. 2B is an end view of what is shown in FIG. 2A.

In some embodiments, and as previously explained in reference to FIGS. 1 and 2, each vacuum interrupter 7 may consist of a pair of vacuum interrupters 10 which are connected in parallel. In such a configuration, the controllable switches 9 can also consist of n pairs of controllable switches 9, as shown in FIG. 5. These pairs of controllable switches 9 can disable or enable the vacuum interrupters 10 by enabling or disabling the motors 12 that control the opening and closing of the vacuum interrupters 10.

Further optionally, the second controller 33 can have a rotatable cam unit 20, examples of which are shown in FIGS. 4, 7, 8, and 12. The rotatable cam unit 20 responds to the command output 17 so as to command the controllable switches 9 depending on the operating position of the position detectors 15. In most embodiments, the term "command" refers to the ability of the rotatable cam unit 20 to enable or disable a controllable switch 9, as will be further explained below, thereby controlling whether the interrupter 7 associated with that controllable switch 9 will be disabled or enabled.

The rotatable cam unit 20 has a rotatable cam 22 which can rotate between a given number n of predetermined positions, and according to a predetermined sequence. As will be further explained below, each of these predetermined positions may affect the operation of the pairs of vacuum interrupters 10. Each of the predetermined positions places the rotatable cam 22 in a location where command signals are sent to the controllable switches 9 to cut off power or supply signals which supply at least one of the motors 12 of a given vacuum interrupter 10, thereby disabling at least one pair of the vacuum interrupters 10.

The rotation of the rotatable cam 22 through the n predetermined positions, and its effect on the controllable switches 9, is better exemplified in FIGS. 9 to 11, and 13A to 13B.

Figure 9:
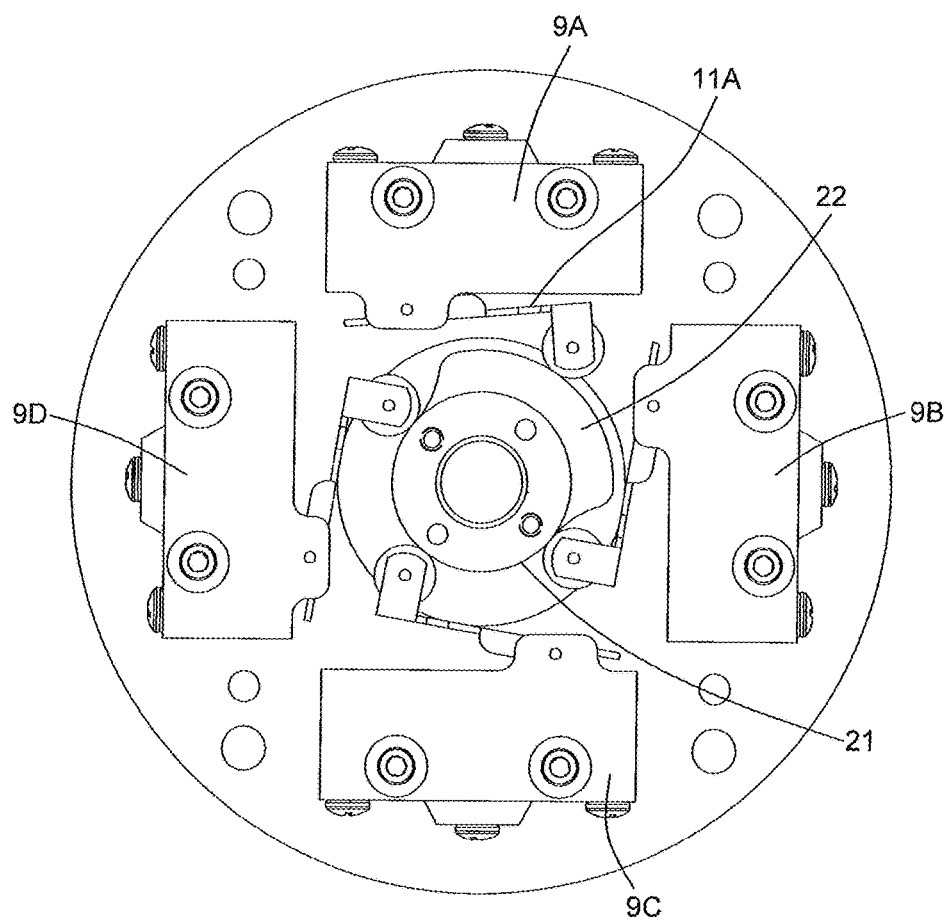
FIG. 9 is a front view of multiple controllable switches in rotational contact with a rotatable cam in a first position, according to another preferred embodiment of the present invention.
Figure 13A:
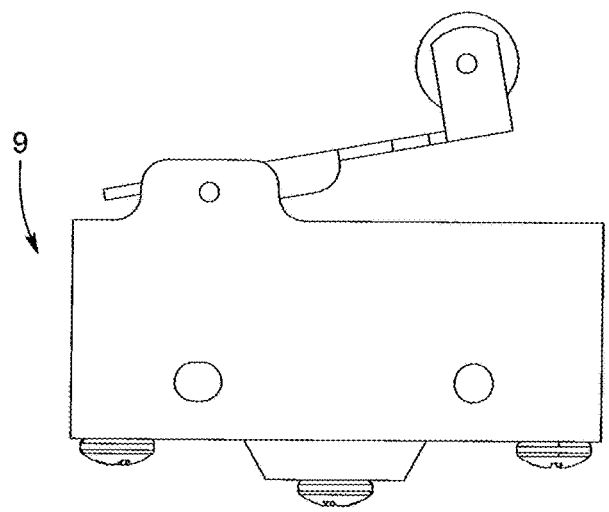
FIG. 13A provides a side elevational view of a controllable switch.
Figure 13B:
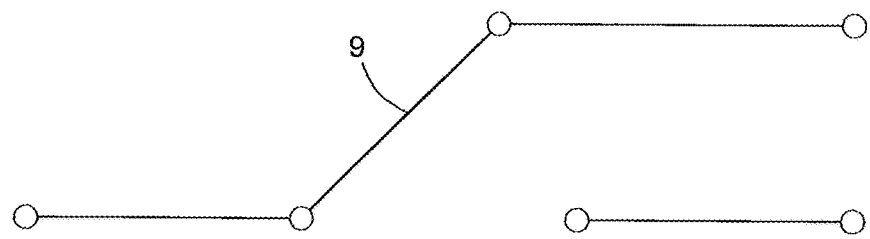
FIG. 13B is a circuit diagram of the controllable switch of FIG. 13A.

FIGS. 13A and 13B provide an example of a controllable switch 9 and its schematic equivalent. FIG. 9 provides an example of four controllable switches 9A, 9B, 9C, and 9D. FIG. 9 also shows the rotatable cam 22 being positioned in a first of the n predetermined positions. As can be understood when referring to FIGS. 9 to 11, the rotatable cam 22 can be rotated through multiple predetermined positions. In the present embodiments, there are four predetermined positions, each one being separated from a neighbouring predetermined position by an angular interval of approximately 90° for a bundle of four conductors 6. Such angles may vary if required. Indeed, in some embodiments, the angular interval is determined by dividing 360° by the number of conductors 6 on a given phase line 3.

Returning to FIG. 9, the rotatable cam 22 is shown as being in contact with the first interrupter 9A. The contact of the rotatable cam 22 with a lever 11A of the first interrupter 9A prevents the lever 11A from contacting a shaft 21 of the rotatable cam 22. This breaking of contact commands the first controllable switch 9A to cut off any supply signals being transmitted to the motor 12 of the interrupter 7 associated with the first controllable switch 9 A, thus disabling that interrupter 7.

Figure 10:
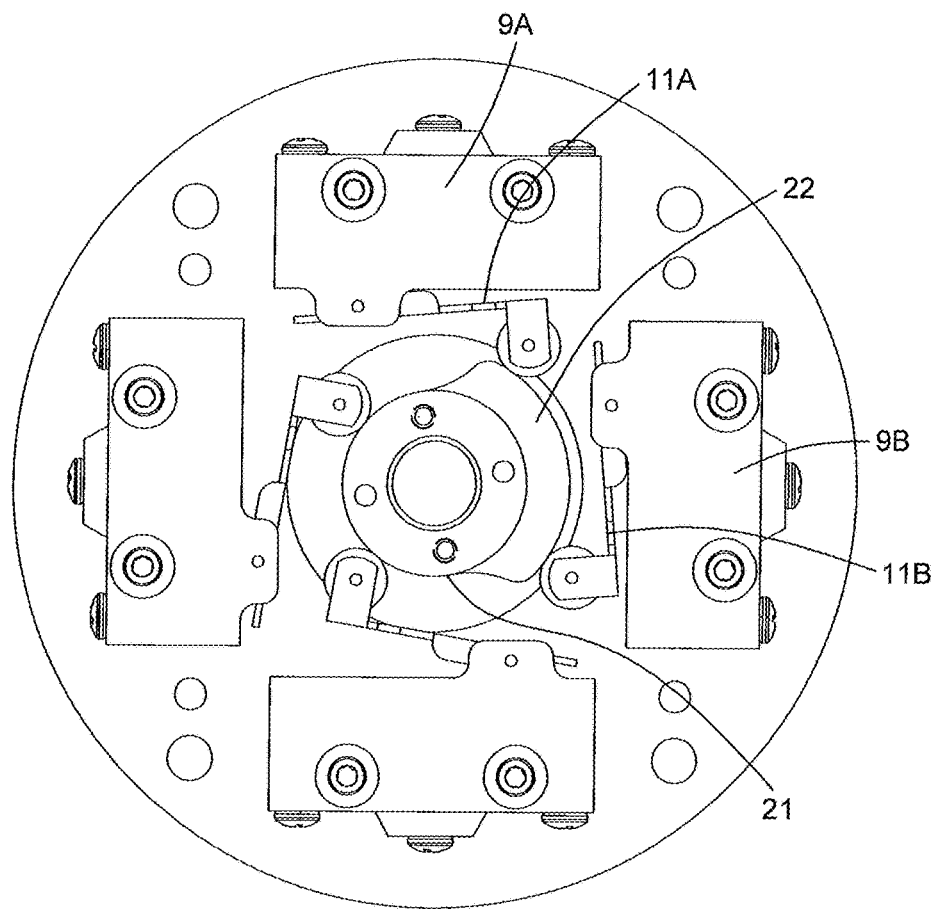
FIG. 10 is another front view of what is shown in FIG. 9, the rotatable cam being shown in a second position.

FIG. 10 shows the rotatable cam 22 in a second position. In this position, the first and second controllable switches 9A, 9B are prevented from supplying supply signals to two corresponding motors 12. The rotatable cam 22 is shown transitioning from one predetermined position to another. The levers 11A, 11B in contact with the rotatable cam 22 are both prevented from contacting the shaft 21 of the rotatable cam 22. As can be understood, this breaking of contact prevents the supply signals from being transmitted to the motors 12 associated with the first and second controllable switches 9A, 9B, thus disabling the corresponding interrupter 7.

Figure 11:
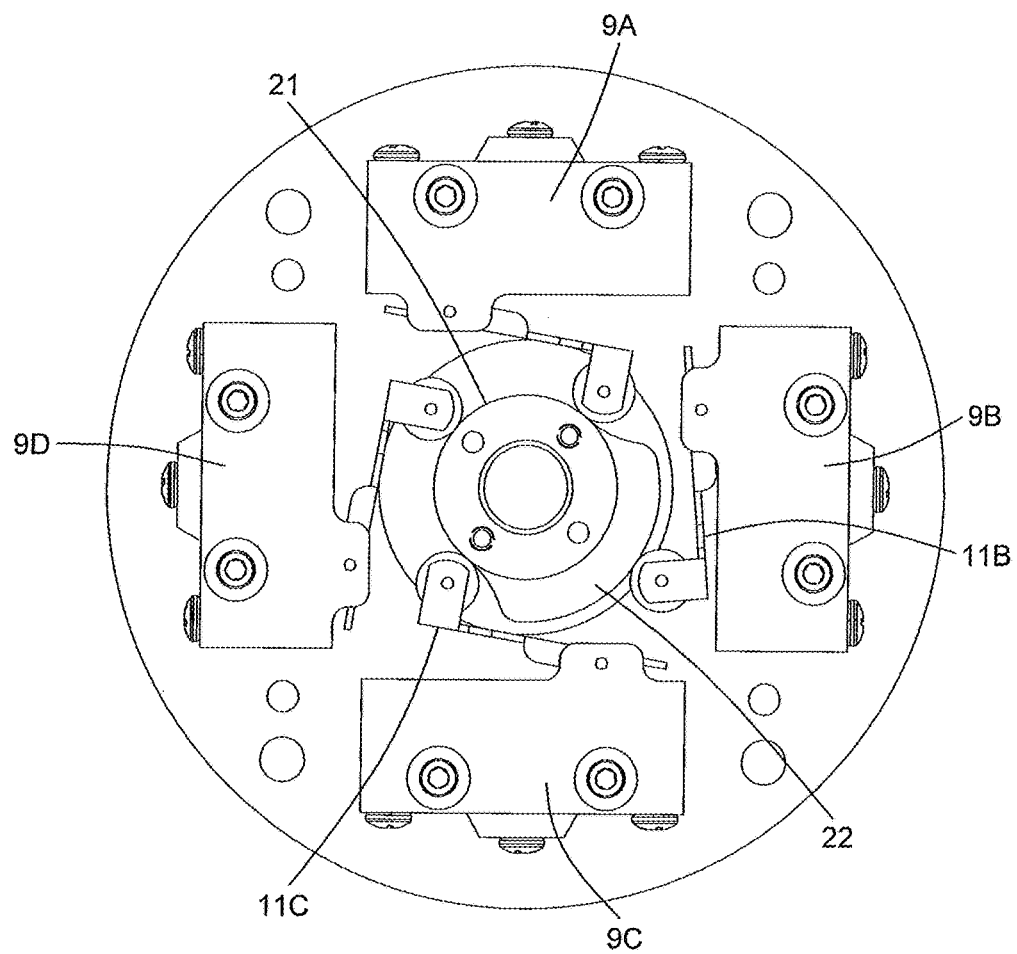
FIG. 11 is another front view of what is shown in FIG. 9, the rotatable cam being shown in a third position.

FIG. 11 shows the rotatable cam 22 in a third position. In this position, the second controllable switch 9B is prevented from supplying supply signals to a corresponding motor 12. The lever 11B in contact with the rotatable cam 22 is prevented from contacting the shaft 21 of the rotatable cam 22. As can be understood, this breaking of contact prevents the supply signals from being transmitted to the motor 12 associated with the second controllable switch 9B, thus disabling the corresponding interrupter 7.

In light of the preceding, it can be appreciated that the transition from one predetermined position to another predetermined position allows the disabling unit 40 to enable and disable the motors 12 of the interrupters 7, thus disabling certain interrupters 7 and preventing them from being commanded. It can further be appreciated that the transition from one predetermined position to another always keeps at least one of the interrupters 7 in a closed and disabled position.

Consider the following example in reference to FIG. 11. There are four interrupters 7 on a given phase line 3. The interrupters 7 associated with controllable switches 9A, 9C, and 9D are all in the open position, and only the interrupter 7 associated with the controllable switch 9B is disabled and closed. As previously explained, the interrupter 7 associated with the controllable switch 9B cannot be opened because it is disabled. In some instances, it may be desired to move the interrupter 7 associated with the controllable switch 9C into a disabled and closed position, and to open all the other interrupters 7 so that the current only flows through the conductor 6 having the interrupter 7 associated with the controllable switch 9C.

In the present embodiment, and for safety purposes, all of the interrupters 7 must be in the closed position before the rotatable cam 22 can be rotated. This advantageously ensures that at least one of the four interrupters 7 remains in a disabled and closed position when the rotatable cam 22 comes to a stop. Thus, in order to move the interrupter 7 associated with the controllable switch 9C into the disabled and closed position and to open all the other interrupters 7, it is first necessary to close all the interrupters 7 of the phase line 3. The interrupters 7 associated with controllable switches 9A, 9C, and 9D can therefore be moved into the closed position because these interrupters 7 are still enabled. All interrupters 7 are now in the closed position, and it is now therefore possible to rotate the rotatable cam 22.

The rotatable cam 22 can then rotate from the predetermined position associated with controllable switch 9B to the predetermined position associated with controllable switch 9C (not shown). This rotation of the rotatable cam 22 will push lever 11C away from contact with the shaft 21, and will thus prevent the controllable switch 9C from supplying supply signals to the motor 12 of the corresponding interrupter. The interrupter 7 associated with the controllable switch 9C is thus disabled, and prevented from being moved to the open position. Since the interrupters 7 associated with the controllable switches 9A, 9B, and 9D are now enabled, these interrupters 7 can all be moved into the open position by the first controller 23 (see FIG. 3).

The relationship between the rotatable cam 22 and the interrupters 7 may be better appreciated by referring to the following table. The table explains the relationship between the position of the rotatable cam 22, which has four predetermined positions, and the motors 12 controlling the position of the vacuum interrupters 10, which are arranged in pairs on each conductor 6, according to one possible embodiment of the invention.

Returning to FIGS. 4, 6, 7, 8, and 12, the second controller 33 has an input 11,13 that can supply the cam motor 26 of the second controller 33. When the input 11,13 is supplied, the cam controller 28 of the second controller 33 is then in position to command the cam motor 26 via its command output 17. The cam motor 26 can rotate the rotatable cam 22 through the n predetermined positions. The cam motor 26 can be a stepper motor, a DC motor with a speed reducer, or any other suitable motor which can rotate the rotatable cam 22 at a relatively low speed.

FIGS. 3 and 6 schematically illustrate the power supply 25 for the cam motor 26. The power supply 25 of the cam motor 26 can itself receive power from a central DC power supply 36. In this embodiment, the cam motor 26 only receives electrical power or supply signals, and thus can only rotate the rotatable cam 22, if all the position detectors 15 are in the closed position. FIGS. 3 and 6 schematically show this operational condition by illustrating the position detectors 15 associated with each of the vacuum interrupters 10. In some instances, when a vacuum interrupter 10 is in a closed position, the position detectors 15 associated with that vacuum interrupter 10 will be placed in a closed position which means an "ON" position. When all the interrupters 10 are in the closed position, all the position detectors 15 will be in the "ON" position, and the cam motor 26 will then be commandable by means of the command output 17 of the cam controller 28.

Returning to FIGS. 7 and 8, the cam motor 26 can be commanded by the cam controller 28, which commands the cam motor 26 to rotate the rotatable cam 22 through the n predetermined positions according to the predetermined sequence, only when the supply input 11,13 is enabled. The cam controller 28 can be fused or otherwise integrated with the first controller 23, and both can be commanded by a single processor.

The position detectors 15 are detector switches 15 with inputs. When all of the detector switches 15 are closed, the supply input 11,13 is enabled. The purpose of the detector switches 15 is to detect which of the pair of vacuum interrupters 10 is closed. Once they have detected the closed positions, the detector switches 15 close their outputs associated with the vacuum interrupters 10.

In some embodiments (not shown), the condition where the pairs of vacuum interrupters 10 which correspond to the current and the next position of the rotatable cam 22 are closed is sufficient to enable the supply input 11,13.

In the embodiment shown in FIG. 6, the condition is met when all of the pairs of vacuum interrupters 10 are closed. Stated differently, the position detectors 15 or detector switches 15 will enable the supply input 11,13 so as to allow the rotatable cam 22 to rotate if the following condition is

| | Status of the motor 12 corresponding to the following vacuum interrupters 10: | | | | | | | |
|---|---|---|---|---|---|---|---|---|
| Position | 1Left | 1Right | 2Left | 2Right | 3Left | 3Right | 4Left | 4Right |
| 1 | Disabled | Disabled | Enabled | Enabled | Enabled | Enabled | Enabled | Enabled |
| 2 | Enabled | Enabled | Disabled | Disabled | Enabled | Enabled | Enabled | Enabled |
| 3 | Enabled | Enabled | Enabled | Enabled | Disabled | Disabled | Enabled | Enabled |
| 4 | Enabled | Enabled | Enabled | Enabled | Enabled | Enabled | Disabled | Disabled |

It can thus be appreciated that, as the rotatable cam 22 rotates through the predetermined positions, it enables or disables the motors 12 corresponding to the vacuum interrupters 10, thus enabling or disabling the vacuum interrupters 10 themselves.

met: the position detectors 15 have determined that the pair of vacuum interrupters 10 are all closed.

Referring now to FIGS. 5, 7, and 8, the cam controller 28 has a position encoder 30. The position encoder 30 detects the position of the rotatable cam 22, and generates a corresponding cam position signal for processing by the cam controller 28, as further explained below. The cam position signals are indicative of the position.

Referring to FIG. 8, the generation of cam position signals can be achieved in other ways as well. In one embodiment, the rotatable cam unit 20 or the cam controller 28 can have a position cam 29. The position cam 29 is rigidly connected to the rotatable cam 22, such as by the shaft 21 described above. The expression "rigidly connected" refers to the ability of the position cam 29 to rotate at the same angular velocity as the rotatable cam 22. The cam controller 28 can also have cam position switches 27 that are connected to the position cam 29. These cam position switches 27 can output the above-described cam position signals.

In another embodiment shown in FIG. 7, the cam controller 28 can be configured for redundancy purposes, i.e. to double-check the position of the rotatable cam 22. Such a cam controller 28 can have a position encoder 30, such as the one described above, so as to generate a first cam position signal. The cam controller 28 can also have a position cam 29, such as the one described above, and can further include cam position switches 27. In this embodiment, the cam motor 26 can be commanded by the command output 17 of the cam controller 28 upon the supply input 11,13 being enabled. The command output 17 can thus supply a supply signal to the supply terminals 14 of the cam motor 26 and command the cam motor 26 to rotate the rotatable cam 22 to the next position. This can be accomplished as per the following sequence. The supply terminals 14 are closed and the cam motor 26 is enabled. This causes the rotatable cam 22 to rotate, and also causes the position cam 29 to rotate. The rotation of the position cam 29 closes the cam position switches 27, at which point the supply terminals 14 is opened. The cam motor 26 will still be enabled until the position cam 29 rotates to a position where the cam position switches 27 are opened, thus disabling the cam motor 26. When the command output 17 stops supplying the cam motor 26, the encoder 30 confirms the position of the rotatable cam 22.

In some embodiments, and as shown in FIG. 8, the command output 17, when the supply input 11,13 is enabled, sends an supply signal to the supply terminals 14, thus commanding the cam motor 26 to rotate the rotatable cam 22. The cam motor 26 rotates the rotatable cam 22 until the encoder 30 confirms the position reached by the rotatable cam 22, and sends a signal to stop rotation of the rotatable cam 22. As the position cam 29 stops rotating as well, the cam position switch 27 emits a second cam position signal, which can confirm the position of the rotatable cam 22 as well.

It can thus be appreciated that the position of the rotatable cam 22 can be verified in two independent ways—i.e. through the first cam position signal generated by the position encoder 30, and through the second cam position signal generated by the cam position switches 27. In such a configuration, the inputs of the cam controller 28 can receive either the first or second cam position signals, and use either one of the first or second position signals so as to control the rotation of the rotatable cam 22.

Figure 14:
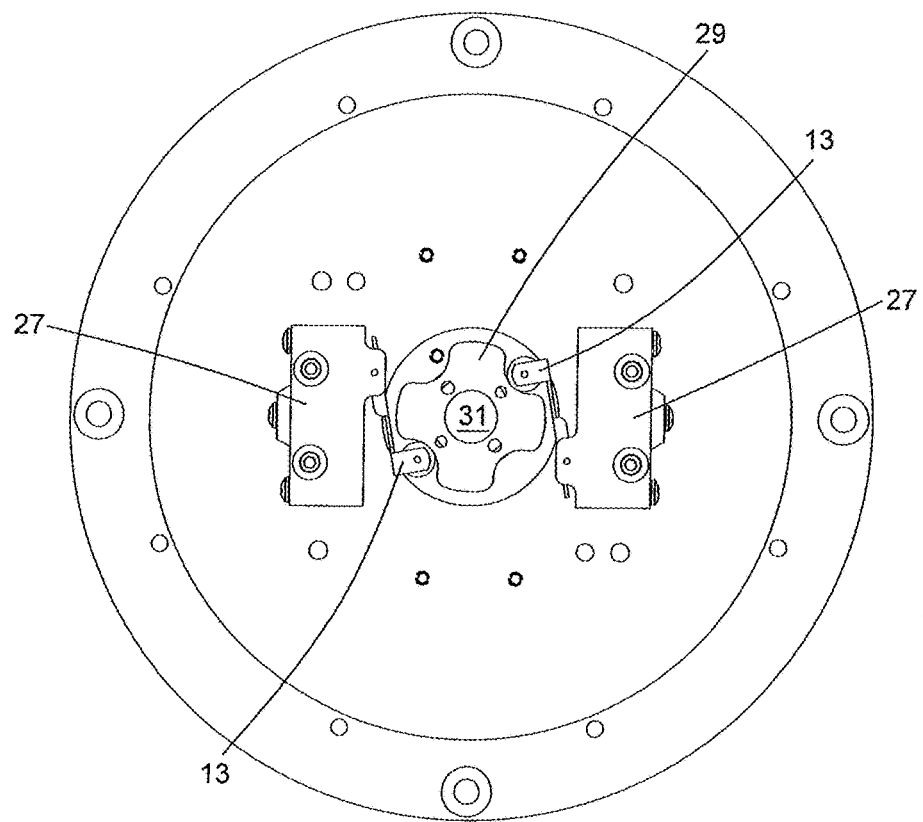
FIG. 14 is a front view showing multiple cam position switches in rotational contact with a position cam in a first position, according to another preferred embodiment of the present invention.
Figure 15:
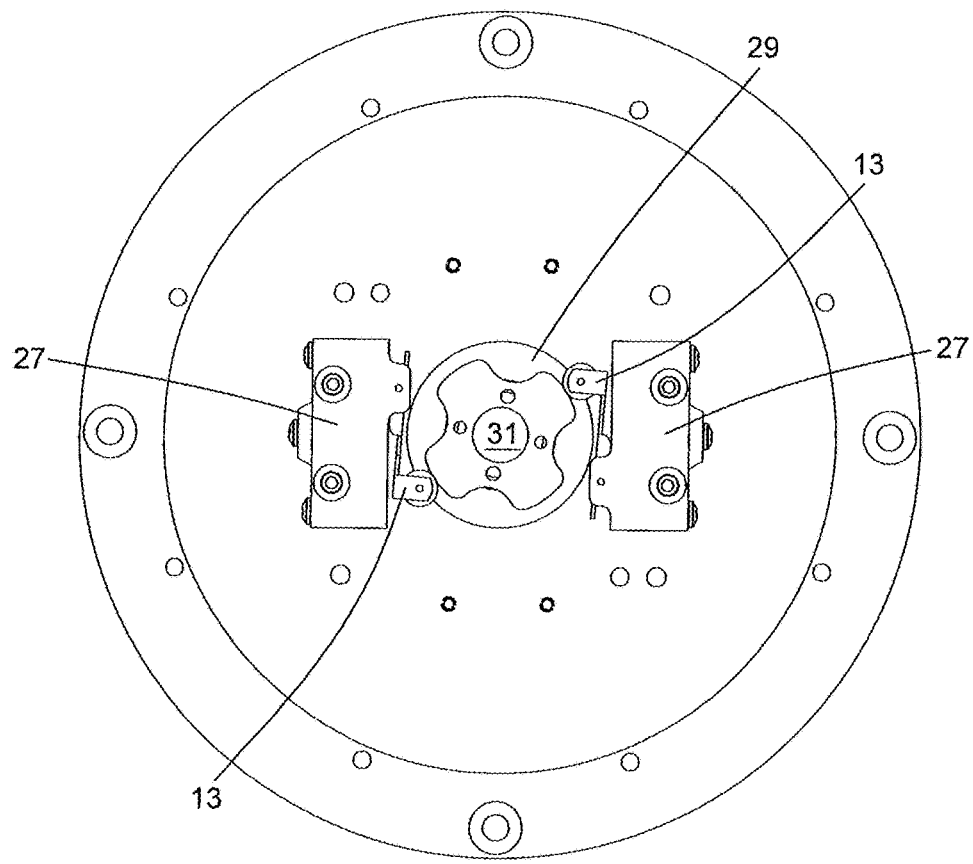
FIG. 15 is another front view of what is shown in FIG. 14, the position cam being shown in a second position.

An example of the rotation of the position cam 29 and its cooperation with the cam position switches 27 is shown in FIGS. 14 and 15. The position cam 29 rotates along with the rotatable cam 22 because of their rigid connection. The rotation of the position cam 29 causes it to interact with levers 13 of the cam position switches 27 so as to push the levers 13 toward and away from a center 31 of the position cam 29. The movement of the levers 13 toward and away from the center 31 of the position cam 29 causes the cam position switches 27 to generate a signal which indicates the position of the rotatable cam 22.

Referring now to FIGS. 1 to 11, we will now describe a method for varying the impedance of a phase line 3 of a segment 2 of an electrical power line 4. As previously explained, the phase line 3 includes n conductors 6, n being at least 2, which are electrically insulated from each other and short-circuited together at two ends of the segment 2. Similarly to the conductors 6 described above, each conductor 6 has a controllable interrupter 7 in series with the connector 6 which has command terminals 8 for receiving command signals so as to selectively switch that interrupter 7 into a closed or an opened position.

The method includes step a), which involves detecting a parameter representative of an actual or current operating condition of the phase line 3, such as by using the parameter detector 50 described above.

The method also includes step b), which involves commanding the interrupters 7 via their command terminals 8 based on the parameter detected in step a). Such commanding can be performed by a first controller 23, such as the one described above.

The method also includes step c), which involves disabling the interrupters 7 by means of n controllable switches 9 which are associated respectively to the controllable interrupters 7. Such disabling can be achieved by using a disabling unit 40, such as the one described above.

Step c) includes the additional step i), which involves detecting which of the interrupters 7 is closed. This detection can be achieved by using a position detector 15 or detector switches 15, such as those described above. Step c) also includes the additional step ii), which involves commanding the controllable switches 9 so that, at all operating times, at least one of the interrupters 7 is closed and disabled. Such command of the controllable switches 9 can be achieved using a second controller 33, such as the one described above. In light of the preceding, it can be appreciated that the present invention may allow maintaining one interrupter in a closed position at all times, thereby removing the need for some of the complex redundancy and safety requirements of prior art "make-or-break" systems for a given phase line, and help to reduce costs.

The invention claimed is:

1. A switching apparatus for varying an impedance of a phase line of a segment of an electrical power line, the phase line including n conductors electrically insulated from each other, n being equal to or greater than 2, the n conductors being short-circuited together at two ends of the segment; the apparatus comprising:
   for each conductor, a controllable interrupter connected in series, said interrupter having command terminals for receiving first command signals for selectively switching said interrupter into a closed or an opened position;
   a parameter detector for detecting a parameter representative of an actual operating condition of the phase line;
   a first controller for controlling the interrupters via their command terminals, according to the parameter detected by the detector; and
   a disabling unit for disabling the interrupters, said disabling unit comprising:
      n controllable switches associated respectively to the n controllable interrupters for respectively disabling the n controllable interrupters;
      position detectors for detecting which of the n interrupters is closed; and a second controller having first inputs for receiving position signals from the position detectors, a second input for receiving second command signals for commanding the disabling unit, and command outputs to command the n controllable switches in view of said second command signals and said position signals so that, at all operating times, at least one of the n interrupters is closed and disabled.

2. The switching apparatus according to claim 1, wherein each of the n interrupters is made of at least one vacuum interrupter, each of the vacuum interrupters having a motor for selectively opening and closing the corresponding vacuum interrupter in response to said command signals, each motor having supply terminals.

3. The switching apparatus according to claim 2, wherein:
each of said at least one vacuum interrupter is made of a pair of vacuum interrupters connected in parallel, and
the n controllable switches are respectively made of n pairs of controllable switches for disabling the n pairs of vacuum interrupters.

4. The switching apparatus according to claim 3, wherein the second controller comprises:
a rotatable cam unit providing the command outputs to command the n pairs of controllable switches depending on their operating position, the rotatable cam unit having a rotatable cam capable of rotating in n predetermined positions according to a predetermined sequence, each of said n predetermined positions corresponding to a position where one of the n pairs of vacuum interrupters is disabled by cutting off supply signals to the corresponding pair of motors via the corresponding pairs of controllable switches;
a cam motor for rotating the rotatable cam, having supply terminals; and
a cam controller for rotating the rotatable cam through the n predetermined positions according to the predetermined sequence by commanding the cam motor.

5. The switching apparatus according to claim 4, wherein the position detectors comprise detector switches having inputs respectively connected to the n pairs of vacuum interrupters for detecting which of the n pair of vacuum interrupters is closed, and outputs for providing the supply signals to the supply terminals of the cam motor only when the pairs of vacuum interrupters corresponding to at least actual and next positions of the rotatable cam, are closed.

6. The switching apparatus according to claim 4, wherein the n predetermined positions are four predetermined positions, each predetermined position being separated by an angular interval of 90°.

7. The switching apparatus according to claim 4, wherein the cam controller comprises a position encoder to detect the position of the rotatable cam, and generate a cam position signal.

8. The switching apparatus according to claim 4, wherein the cam controller comprises a position cam rigidly connected with the rotatable cam, and cam position switches having inputs connected to the position cam, and output to generate a cam position signal.

9. The switching apparatus according to claim 4, wherein the cam controller comprises:
a position encoder to detect the position of the rotatable cam, and generate a first cam position signal:
a position cam rigidly connected with the rotatable cam; and
cam position switches having inputs connected to the position cam, and output to generate a second cam position signal, so that the position of the rotatable cam is confirmable by means of either the first or second cam position signals.

10. The switching apparatus according to claim 9, wherein the cam controller has an input for receiving either the first or the second cam position signals, to control rotation of the rotatable cam by means of one of said first and second cam position signals.

11. The switching apparatus according to claim 4, wherein the outputs of the position detectors are for providing the supply signals to the supply terminals of the cam motor only when the pairs of vacuum interrupters corresponding to all of the positions of the rotatable cam, are closed.

12. The switching apparatus according to claim 1, wherein the second input of the second controller are for receiving said command signals from the first controller.

13. A method for varying an impedance of a phase line of a segment of an electrical power line, the phase line including n conductors electrically insulated from each other, n being equal to or greater than 2, the n conductors being short-circuited together at two ends of the segment, each conductor having a controllable interrupter being connected in series, said controllable interrupter having command terminals for receiving command signals for selectively switching said interrupter into a closed or an opened position, the method comprising steps of:
a) detecting a parameter representative of an actual operating condition of the phase line;
b) controlling the interrupters via their command terminals, according to the parameter detected in step a); and
c) disabling the interrupters by means of n controllable switches associated respectively to the n controllable interrupters, said step c) comprising steps of:
i) detecting which of the n interrupters is closed; and
ii) commanding the n controllable switches so that, at all operating times, at least one of the n interrupters is closed and disabled.

14. The method according to claim 13, where each of the n interrupters is made of a pair of vacuum interrupters connected in parallel, each of the vacuum interrupters having a motor for selectively opening and closing the corresponding vacuum interrupter in response to said command signals, each motor having supply terminals:
in step c), the n controllable switches are respectively made of n pairs of controllable switches for disabling the n pairs of vacuum interrupters, the step c) further comprises steps of:
commanding the n pairs of controllable switches by means of a rotatable cam depending on its operating position, the rotatable cam being capable of rotating in n predetermined positions according to a predetermined sequence, each of said n predetermined positions corresponding to a position where one of the n pairs of vacuum interrupters is disabled by cutting off supply signals to the corresponding pair of motors via the corresponding pair of controllable switches; and
rotating the cam by means of a cam motor having supply terminals, into a next of the n predetermined positions by supplying supply signals to supply terminals of a cam motor by means of a controllable switch to enable said cam motor, only when the following condition is met: the pairs of vacuum interrupters corresponding to actual and next positions of the cam, are closed.

15. The method according to claim 14, wherein the condition also requires that the pairs of vacuum interrupters corresponding to all of the positions of the cam are closed.

* * * * *